United States Patent [19]

Ito et al.

[11] Patent Number: 5,087,490

[45] Date of Patent: Feb. 11, 1992

[54] METHOD FOR MAKING AN IMPREGNATED CERAMIC MATERIAL

[75] Inventors: Kazuo Ito, Yamagata; Shuitsu Matsuo, Atsugi; Yasumi Sasaki, Nagai, all of Japan

[73] Assignee: Toshiba Ceramics Co., Ltd., Japan

[21] Appl. No.: 510,197

[22] Filed: Apr. 17, 1990

Related U.S. Application Data

[62] Division of Ser. No. 309,631, Feb. 13, 1989, Pat. No. 4,963,396.

[51] Int. Cl.$^5$ .............................................. E06B 00/00
[52] U.S. Cl. .................................. 428/34.1; 428/408; 373/45; 373/157
[58] Field of Search .............. 428/408, 367, 220, 34.1, 428/34.4; 501/87; 373/45, 157

[56] References Cited

U.S. PATENT DOCUMENTS 4,387,080 6/1983 Hatta et al. ............................ 501/87

Primary Examiner—Patrick J. Ryan
Assistant Examiner—J. Weddington
Attorney, Agent, or Firm—Lorusso & Loud

[57] ABSTRACT

A method for impregnating a shaped ceramic material with an impregnation liquid, comprising the steps of placing the shaped ceramic material in the impregnation liquid, and applying an impregnation pressure to the impregnation liquid through a pressure transfer liquid so that the shaped ceramic material is impregnated with the impregnation liquid.

4 Claims, 2 Drawing Sheets

METHOD FOR MAKING AN IMPREGNATED CERAMIC MATERIAL

This is a division, of application Ser. No. 07/309,631 filed Feb. 13, 1989 now U.S. Pat. No. 4,963,396.

BACKGROUND OF THE INVENTION

This invention relates to a method for impregnating a ceramic material such as a carbonaceous material or carbon material with an impregnation liquid and a product produced thereby.

A carbonaceous material is a typical example of various ceramic materials used as a structural material or a material for machines. Such a carbonaceous material is a good thermal and electric conductor and has an excellent thermal resistance. In particular, its strength does not decrease at high temperatures.

On the other hand, the carbonaceous materials are porous. Thus, they do not have a good mechanical strength. Also, they are easily oxidized and therefore consumable.

In view of the foregoing, many researchers have tried to obtain a high density carbonaceous material which maintains it excellent characteristics for a long period of time. For example, dense particles are packed with a high density.

In another conventional method, pores of a carbonaceous material are impregnated with an impregnation liquid such as pitch. For instance, a shaped carbonaceous material and an impregnation liquid are set in a container. Pressurized air is applied directly to the impregnation liquid in such a way that the pores of the carbonaceous material are impregnated with the impregnation liquid to thereby produce a high density carbonaceous material. The impregnation liquid is heated at 80° C. or more. The pressure of the pressurized air is 20 Kg/cm² or less. In such a conventional method, however, the density of the carbonaceous material is not sufficiently high. The impregnation is not satisfactory.

SUMMARY OF THE INVENTION

The object of the invention is to provide a sufficiently high density ceramic material such as a carbonaceous material and a method of making the same.

According to the invention, an impregnation pressure is applied via a pressure transfer liquid to an impregnation liquid so that pores of a ceramic material are impregnated with the impregnation liquid.

Examples of the pressure transfer liquid are water, ethylene glycol, oil and alcohol.

The best example of a shaped ceramic material is a shaped carbonaceous material, but the invention is not limited thereto. Preferred examples of products made of the ceramic material are a graphite crucible for use in an aluminium deposition method or a CZ (Czochralski) method, a heater, a susceptor base material, a liquid-phase growth boat and a plasma CVD electrode.

Examples of the impregnation liquid are a thermosetting resin such as furfuryl alcohol, resin and tar pitch.

The impregnation pressure is preferably 20 Kg/cm² or more and for the best results 50 Kg/cm² or more.

A resilient material such as a rubber is disposed between the impregnation liquid and the pressure transfer liquid when the shaped ceramic material is impregnated with the impregnation liquid. For instance, a rubber press method is employed. Although it can be carried out at a room temperature, preferably a carbonaceous material is impregnated with tar pitch at a temperature of 100° C. to 280° C.

Preferably, the impregnation liquid has a viscosity of 300 C.P.(centipoise) at 20° C.

According to the invention, the impregnated carbonaceous material has a bulk density of 1.5 to 2.0 g/cm³, a specific resistance of 500 to 1900 micro-ohm-cm, a bending strength of 300 Kg/cm² or more, an apparent or open porosity of 0.1 to 7.0%, and a true specific gravity of 2.10 or less.

As the bulk density ranges between 1.5 g/cm³ and 2.0 g/cm³, if a crucible is made of the carbonaceous material, the surface thereof is not rough, and the material can be prevented from being graphitized too much. The bonding among the carbon particles is sufficiently maintained because the bending strength is 300 Kg/cm² or more. As the carbonaceous material has a specific resistance of 500 to 1900 micro-ohm-cm, the carbon particles can be prevented from being crystalized too much so as to remain extremely flexible. Also, the heating value does not become too large, so that temperature control is easy. Further, because the carbonaceous material has an apparent porosity of 0.1 to 7.0%, the pores among the carbon particles will not become so large as to decrease the bonding strength. For example, a crucible made of such a carbonaceous material is difficult to crack. Also, the carbon particles can be prevented from dislodging when silicon wafers for a semiconductor device are processed in a plasma CVD apparatus. If the true specific gravity is more than 2.10, the carbon particles are apt to be crystalized too much whereby the carbonaceous material lacks proper flexibility. In such a case, the service life decreases.

Accordingly, the present invention provides a carbonaceous material or carbon material having a bulk density of 1.5 to 2.0 g/cm³, an apparent porosity of 0.1 to 7.0%, and an air permeability ranging between 0 and 1.0 × 10⁻⁴ ml.cm/cm².sec.cm.

Substantially no open pores are present in the carbonaceous material, so that it is not air permeable. Thus, spalling resistance is excellent.

When the air permeability is less than $1.0 \times 10^{-4}$ ml.cm/cm².sec.cm, a low density fine carbon can be formed in the pores of the carbonaceous material. As a result, it is possible to decrease the volume of the gas which is produced from a graphitized crucible when pulling silicon crystals. On the other hand, the apparent porosity of 0.1 to 7.0% is effective for preventing spalling of a crucible.

Preferably, prior to applying the impregnation pressure to the impregnation liquid, a negative pressure is applied to the shaped material so that any gas remaining in the shaped material can be discharged therefrom.

DESCRIPTION OF THE EMBODIMENTS

Figure 1:
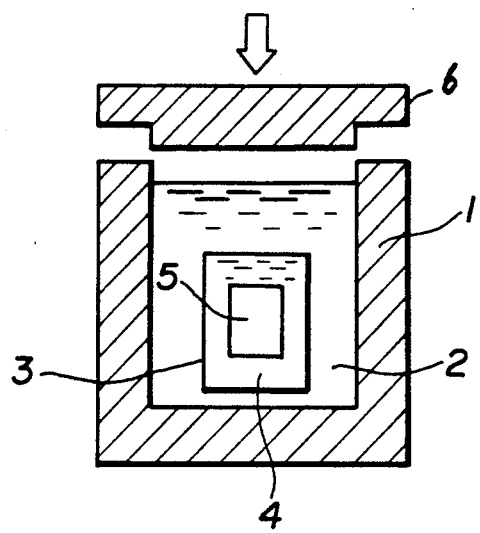
FIG. 1 shows a schematic section of a cold isostatic press machine for carrying out a method of this invention.

FIG. 1 shows a cold isostatic rubber press type impregnation machine.

The pressure transfer liquid is water 2 contained in a pressure-tight container 1. The impregnation liquid is furfuryl alcohol 4 contained in a rubber container 3. A shaped carbonaceous material 5 is also contained in the rubber container 3. The rubber container 3 is designed to be completely closed in operation, but may be opened when desired. The pressure-tight container 1 is closed by a closure 6 while the rubber container 3 is immersed in the water 2. The rubber container 3 functions as a separator.

In operation, the inside of the rubber container 3 is evacuated to 30 torr for ten minutes by means of a vacuum pump (not shown). After that, the furfuryl alcohol 4 is poured into the rubber container 3 by means of a feeder (not shown), and then the water 2 is pressurized such that an impregnation pressure of 300 Kg/cm² or more is applied to the furfuryl alcohol 4 for about one minute whereby the shaped carbonaceous material 5 is impregnated with the furfuryl alcohol. The impregnated carbonaceous material is heated up to 200° C. at a heating rate of 10° C./hour and further heated up to 950° C. at a heating rate of 8° C./hour. Finally, it is subjected to a purification treatment at 2,300° C.

EXAMPLES

Table 1 the results Examples 1 to 4 in which four shaped carbonaceous materials were impregnated with furfuryl alcohol.

The carbonaceous materials of the Examples 1 to 4 shown in Table 1 were impregnated by means of the impregnation apparatus shown in FIG. 1 and found to have the characteristics shown in Table 2.

Figure 2:
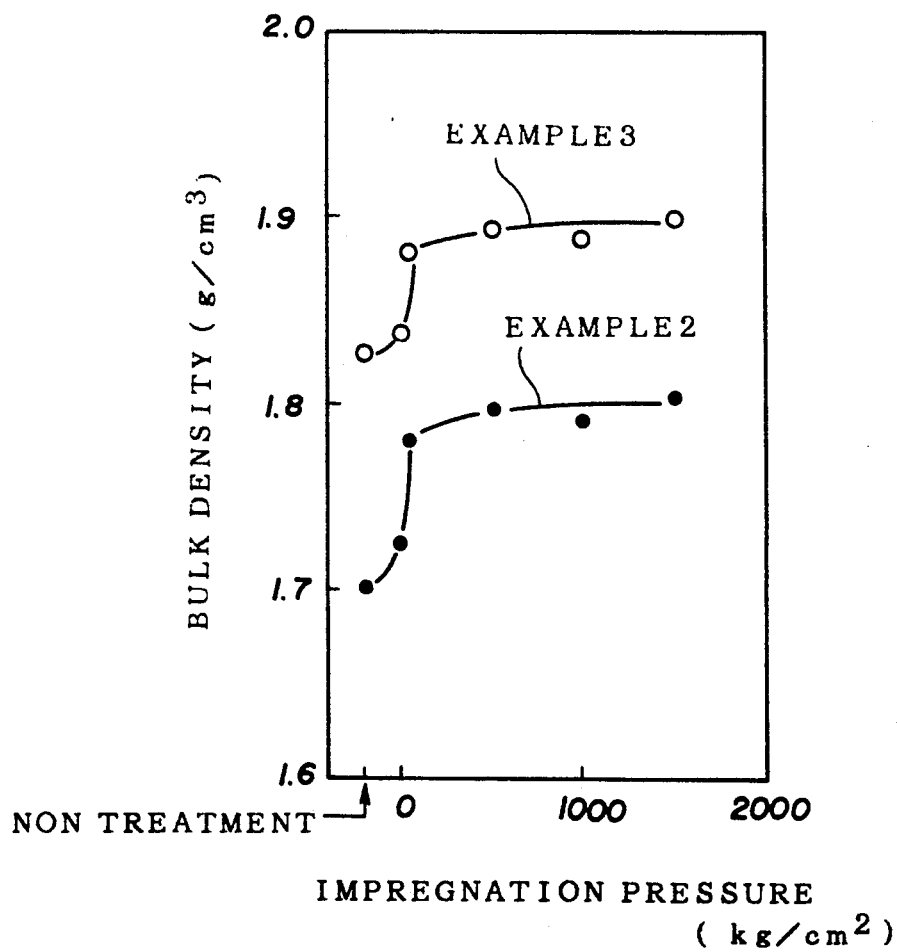
FIG. 2 is a graphic view showing relationships between the bulk density and the impregnation pressure in case of carbonaceous materials.

For purposes of comparison, the shaped carbonaceous materials of Examples 2 and 3 in Table 1 were impregnated with furfuryl alcohol at five impregnation pressures of 1, 50, 500, 1000 and 1500 Kg/cm². The bulk density/impregnation pressure relationships are shown in FIG. 2. Where the impregnation pressure was 1 Kg/cm², many inner pores of the carbonaceous material were not impregnated with the furfuryl alcohol so that the bulk density was not sufficiently increased. At 50 Kg/cm² or more, the bulk density was remarkably increased.

Figure 3:
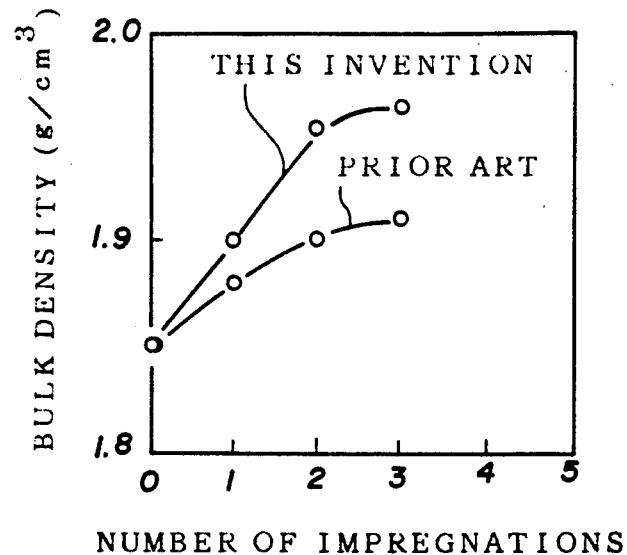
FIG. 3 is a graphic view showing relationships between the bulk density and the number of impregnations for carbonaceous materials.

FIG. 3 shows the relationships between the number of impregnations and the bulk density. The impregnation pressure was 1500 Kg/cm².

As can be seen from FIG. 3, in a conventional low-pressure pitch impregnation method, in the case of one impregnation, the bulk density increases only by several percent, and after that it does not efficiently increase even if an impregnation-firing cycle is repeated. Using high-pressure in the impregnation method of the invention, the impregnation efficiency is improved. In the case of two impregnations, the bulk density increases first to 1.91 g/cm³ and second to 1.96 g/cm³.

Table 3 shows experimental results for six comparative examples in case of graphite crucibles in comparison with a crucible made of a carbonaceous material according to the invention. The comparative examples are out of the scope of the invention with regard to at least one parameter among bulk density, specific resistance, bending strength, apparent porosity, true specific gravity and air permeability. The number of applications of the crucibles in use remarkably differs between the examples of the invention and the comparative examples. In this regard, the number of applications of the crucibles means the number thereof until cracking takes place.

In the experiments, a pure silicon of 35 Kg was melted in the above-described crucibles, and a silicon crystal having a diameter of 5 inch and the crystal orientation (100) was repeatedly pulled at a speed of about 1 mm/min. The volume of produced or discharged gas was measured at a room temperature through 950° C.

Figure 4:
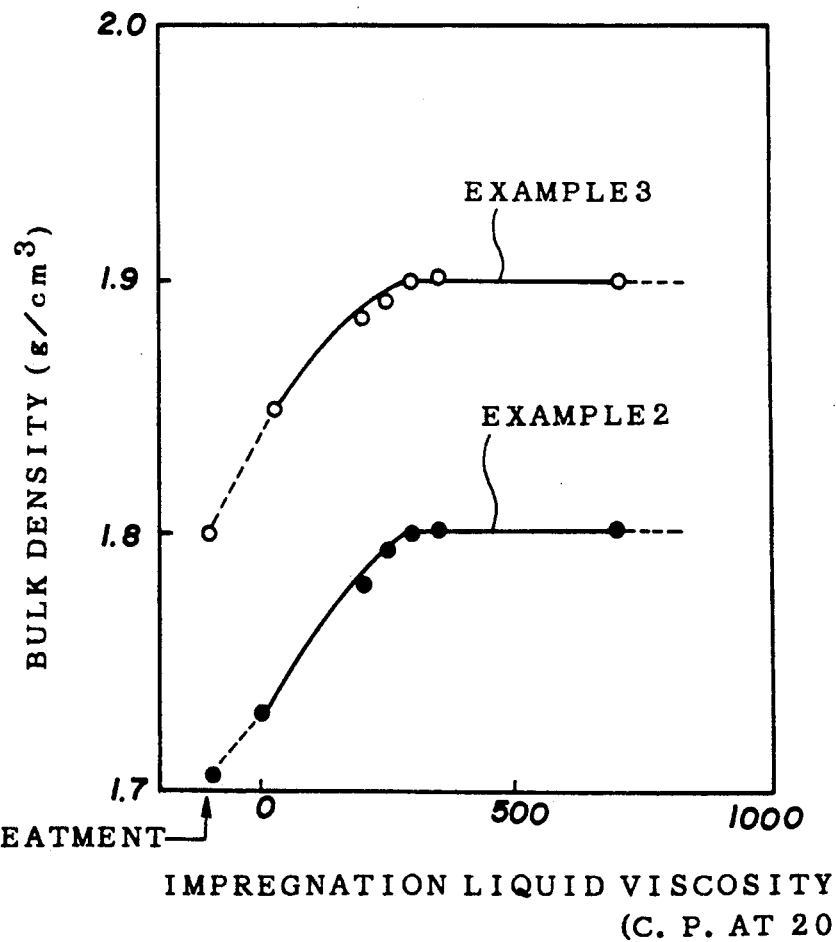
FIG. 4 shows relationships between the bulk density and the impregnation liquid viscosity.

FIG. 4 shows the relationships between the viscosity of impregnation liquid and the bulk density. The impregnation pressure was 1,500 Kg/cm². The shaped carbonaceous materials of Examples 2 and 3 in Table 1 were impregnated with polymerized furfuryl alcohol with viscosities of 30, 200, 250, 300, 350, 700 C.P. at 20° C.

As can be seen from FIG. 4, in case of a low viscosity such as 30 C.P. at 20° C., a large volume of the polymerized furfuryl alcohol is volatilized until a solid is formed. It cannot be expected to increase the bulk density. This is supported by the data in Table 4. The bulk density does not remarkably change between 300 C.P. and 700 C.P. at 20° C. Thus, the viscosity of the impregnation liquid is preferably at least 300 C.P. at 20° C.

TABLE 1

| | Example No. | | | |
|---|---|---|---|---|
| | 1 | 2 | 3 | 4 |
| Bulk density (g/cm³) | 1.6 | 1.7 | 1.8 | 1.9 |
| Bending strength (Kg/cm²) | 300 | 450 | 500 | 600 |
| Specific resistance (micro-ohm-cm) | 2500 | 1400 | 1150 | 1050 |
| Apparent porosity (%) | 18 | 12 | 8 | 8 |
| True specific gravity | 2.15 | 2.14 | 2.12 | 2.11 |
| Air permeability ($\times 10^{-4}$ ml·cm/cm²·sec·cm) | 6.5 | 2.5 | 1.0 | 1.0 |
| Discharged gas volume (ml/100 g) | 10.5 | 11.0 | 8.0 | 9.0 |

TABLE 2

| | Example No. | | | |
|---|---|---|---|---|
| | 1 | 2 | 3 | 4 |
| Bulk density (g/cm³) | 1.7 | 1.8 | 1.9 | 2.0 |
| Bending strength (Kg/cm²) | 350 | 500 | 600 | 700 |
| Specific resistance (micro-ohm-cm) | 1900 | 1200 | 1100 | 1000 |
| Apparent porosity (%) | 7 | 6 | 1 | 0.1 |
| True specific gravity | 2.05 | 2.08 | 2.02 | 2.00 |
| The number of applications of a crucible | 69 | 79 | 77 | 85 |
| Air permeability ($\times 10^{-4}$ ml·cm/cm²·sec·cm) | 0.8 | 0.7 | 0.4 | 0.1 |
| Discharged gas volume (ml/100 g) | 6.5 | 5.0 | 1.0 | 1.6 |

TABLE 3

| | Comparative Example No. | | | | | |
|---|---|---|---|---|---|---|
| | 1 | 2 | 3 | 4 | 5 | 6 |
| Bulk density (g/cm³) | 1.4 | 1.5 | 1.6 | 1.7 | 1.8 | 1.9 |
| Bending strength (Kg/cm²) | 400 | 250 | 400 | 350 | 500 | 350 |
| Specific resistance (micro-ohm-cm) | 5000 | 6000 | 8000 | 1800 | 1000 | 800 |
| Apparent porosity (%) | 7 | 7 | 7 | 15 | 6 | 5 |
| True specific gravity | 2.05 | 2.04 | 2.10 | 2.10 | 2.15 | 2.20 |
| The number of | 7 | 3 | 15 | 13 | 16 | 13 |

TABLE 3-continued

|  | Comparative Example No. | | | | | |
| --- | --- | --- | --- | --- | --- | --- |
|  | 1 | 2 | 3 | 4 | 5 | 6 |
| applications of a crucible in use |  |  |  |  |  |  |
| Air permeability ($\times 10^{-4}$ ml·cm/cm$^2$ sec·cm) | 0.9 | 1.0 | 1.2 | 0.1 | — | — |
| Discharged gas volume (ml/100 g) | 16.3 | 10.4 | 11.4 | 10.3 | — | — |

TABLE 4

| Viscosity (C.P. at 20° C.) | Volatilized Volume (%) | Carbonization Rate after Hardened (%) |
| --- | --- | --- |
| 30 | 24.4 | 37.6 |
| 300 | 14.6 | 44.6 |
| 700 | 13.6 | 45.8 |
| 1350 | 12.9 | 47.4 |

We claim:

1. A material consisting essentially of carbon and having a bulk density of 1.5 to 2.0 g/cm$^3$, a specific resistance of 500 to 1900 micro-ohm-cm, a bending strength of at least 300 Kg/cm$^2$, an apparent porosity of 0.1 to 7.0%, and a true specific gravity of no greater than 2.10.

2. A crucible made of the carbonaceous material of claim 1.

3. A material consisting essentially of carbon and having a bulk density of 1.5 to 2.0 g/cm$^3$, an apparent porosity of 0.1 to 7.0%, and an air permeability ranging between 0 and $1.0 \times 10^{-4}$ ml.cm/cm$^2$.sec.cm.

4. A crucible made of the carbonaceous material of claim 3.

* * * * *